Figure 1:
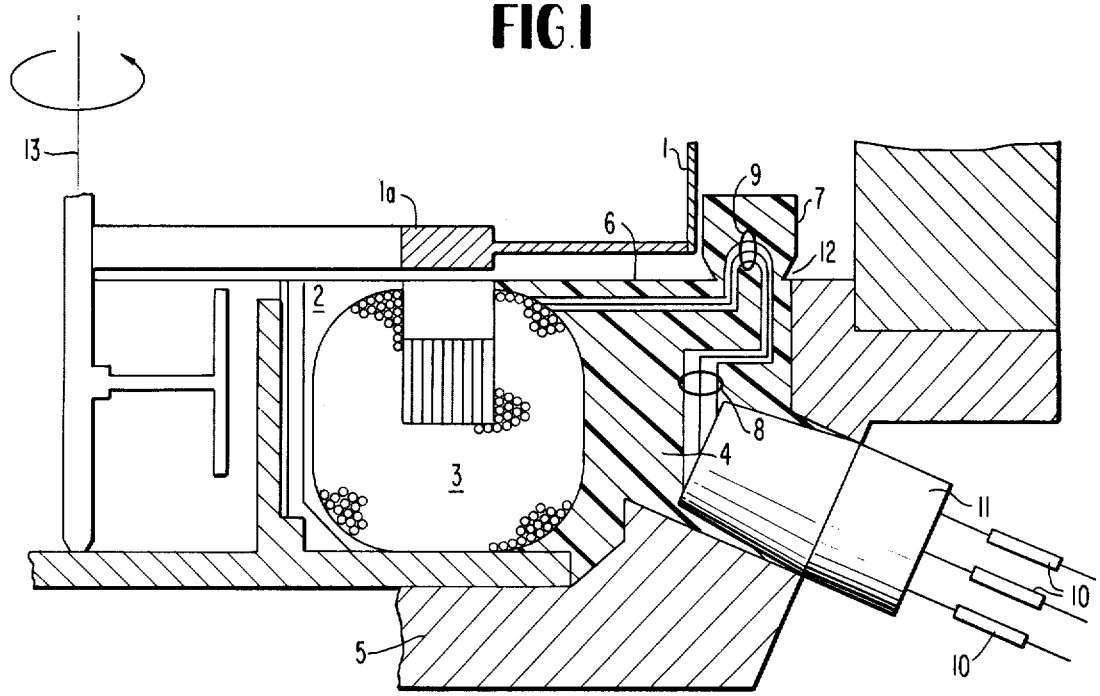

United States Patent
Kreissl et al.

[11] 3,909,673
[45]* Sept. 30, 1975

[54] INSTALLATION FOR STOPPING DRIVE MOTOR OF ROTATING MACHINE IN EVENT OF DESTRUCTION OF A ROTATING MACHINE PART

[75] Inventors: Ottmar Kreissl, Dachau; Eckhard Pritsch, Haaren, Germany

[73] Assignees: Maschinenfabrik Augsburg-Nurnberg AG; URANIT Uran-Isotopentrennungs-GmbH, Germany

[ * ] Notice: The portion of the term of this patent subsequent to Mar. 19, 1991, has been disclaimed.

[22] Filed: Feb. 1, 1974

[21] Appl. No.: 438,628

Related U.S. Application Data
[63] Continuation-in-part of Ser. No. 238,339, March 27, 1972, Pat. No. 3,798,504.

[30] Foreign Application Priority Data
Mar. 25, 1971  Germany............................ 2114406

[52] U.S. Cl.................. 317/13 R; 310/71; 310/273
[51] Int. Cl.² ........................................ H02H 7/08
[58] Field of Search............ 310/71, 68 E, 260, 273, 310/72, 74, 214, 68 B, 68 C; 317/13 R; 200/80 R; 339/80 R, 87; 307/119, 120

[56] References Cited
UNITED STATES PATENTS
| | | | |
|---|---|---|---|
| 2,957,967 | 10/1960 | Macrae............................... | 317/66 |
| 3,100,246 | 8/1963 | Riley.................................... | 317/66 |
| 3,136,842 | 6/1964 | Perkins et al........................ | 339/80 |
| 3,702,419 | 11/1972 | Carothers et al................... | 317/66 |
| 3,798,504 | 3/1974 | Kreissl et al. ...................... | 317/13 R |

*Primary Examiner*—J. D. Miller
*Assistant Examiner*—Patrick R. Salce
*Attorney, Agent, or Firm*—Craig & Antonelli

[57] ABSTRACT

An installation has been provided for shutting off the drive motors of rotating machine parts in case of overload or short-circuit by extending the power supply wires between the stator winding of the motor and a connector plug, loop-shaped in a boss protruding into the space accommodating the rotating machine part so that the power supply wires are broken when the boss is sheared off upon mechanical failure of the machine part. The present invention provides improved means for enhancing the shearing-off of the boss during mechanical failure of the machine part by rotational forces. The improvements include providing the boss with a notch-like portion at its connection with the device and by attaching the boss to the device by means of thin, pin-like connecting means.

2 Claims, 2 Drawing Figures

INSTALLATION FOR STOPPING DRIVE MOTOR OF ROTATING MACHINE IN EVENT OF DESTRUCTION OF A ROTATING MACHINE PART

This application is a continuation-in-part application of copending U.S. Application, Ser. No. 238,339, filed Mar. 27, 1972 now U.S. Pat. No. 3,798,504.

This invention relates to an improved device for shutting off drive motors of rotating machine parts in case of overload and rotational destruction of one of the machine parts, whereby the electrical power supply wires are severed which shuts off the affected machine part by shutting off the drive motor thereof.

A load-absorbing machine part has been described in German Patent No. 922,130 which is to be destroyed under overload conditions in order to avoid major damages, its destruction triggers a switching action by means of which e.g. the drive motor is shut down. In this case, a shear pin is constructed to interrupt an electrical circuit. Upon destruction of a machine part, a loop embedded in the shear pin is simultaneously sheared off and a circuit supplied by a transformer is interrupted. Consequently, a solenoid arranged in the circuit is deenergized and the power supply to the motor is interrupted by means of the armature of a contactor. Due to the required contactor, the expenditures in the circuitry necessary with the device as known heretofore, are very large and the circuitry becomes very sophisticated. Furthermore, no motor shutoff can be expected in case of a short-circuit.

In copending U.S. Application, Ser. No. 238,339 now U.S. Pat. No. 3,798,504, a device is provided for reliably interrupting the motor current supply of a rotating machine without using sophisticated circuitry if a machine part should fail or is destroyed by rotational forces, such as are present in centrifuges. This prior device essentially consisted of providing that the power supply wires between the connector plug and the stator winding of the motor extend, e.g., as a part of the armature sealing compound, in a loop-like manner within a boss or lug protruding into the chamber of the rotating machine parts, whereby the power supply is interruped after shear-off of the boss. A feature of this prior device resided in that the boss is arranged in such a way that, although it will not be damaged during operation, it will be sheared off immediately following overloading or destruction of a machine part.

The advantage of this prior device is seen in that with the shear-off of the so-called boss an interruption of the power supply wires ensures a shut-off of the motor in the same way as would a short circuit between the wires. By reason of the fact that this will lead to the desired effect of shutting off the motor, the reliability of a device according to the present invention is considerably increased. Furthermore, the possibility of a shear-off of the power supply wires proper saves the use of a contactor which in the device known heretofore, such as in the above-mentioned German Patent, serves the purpose of interrupting the current supply. In contradistinction to the use of a contactor only the cost for producing the boss, in which the power supply wires are embedded, have to be considered.

In this prior device, the shearing off of the boss or lug protruding into a chamber of the rotating parts is achieved by fragments flying off of a rotating machine part from centrifugal forces. Upon reaching a predetermined level of rotation at which the rotating machine part begins to break up, various fragments and debris of the rotating part follow a spiral trajectory with a constant angular velocity as long as they are still connected to turning parts. Upon completion of the destruction the debris or fragments begin to follow straight tangential trajectories until they hit the sides of the chamber of the rotating machine part. There they are braked or ricocheted about the inner portion of the chamber. The boss or lug protruding into the chamber of the rotating machine part is struck by one or more of these flying fragments, thereby shearing the boss from its connection in the chamber. In doing so, the power supply wires, which are arranged loop-like in the boss are sheared off or broken.

The present invention provides a means for ensuring the shearing off of the boss or lug protruding into the chamber of the rotating machine part. In one embodiment of the present invention, a notch is provided at the base of the boss at its connection to the chamber of the device so that the smaller thickness of the boss connection to the chamber will enhance the shearing or breaking off of the boss from the chamber upon being struck by the machine part fragments. In a further embodiment of the present invention, the boss is formed in the manner of a connection plug which is attached to the housing of the machine part chamber by means of pin-like connectors, or connecting pins. These connecting pins are very thin, of the order of less than 1/32 inches in diameter. In this arrangement, the rotating machine part fragment striking the boss will easily disrupt the electric connection of the power supply wires to the drive motor.

Accordingly, it is an object of the present invention to provide an improved safety installation for rotating machine parts which enhances by simple means the disruption of the power supply of a drive motor in a rotary machine, as in the prior art.

Figure 2:
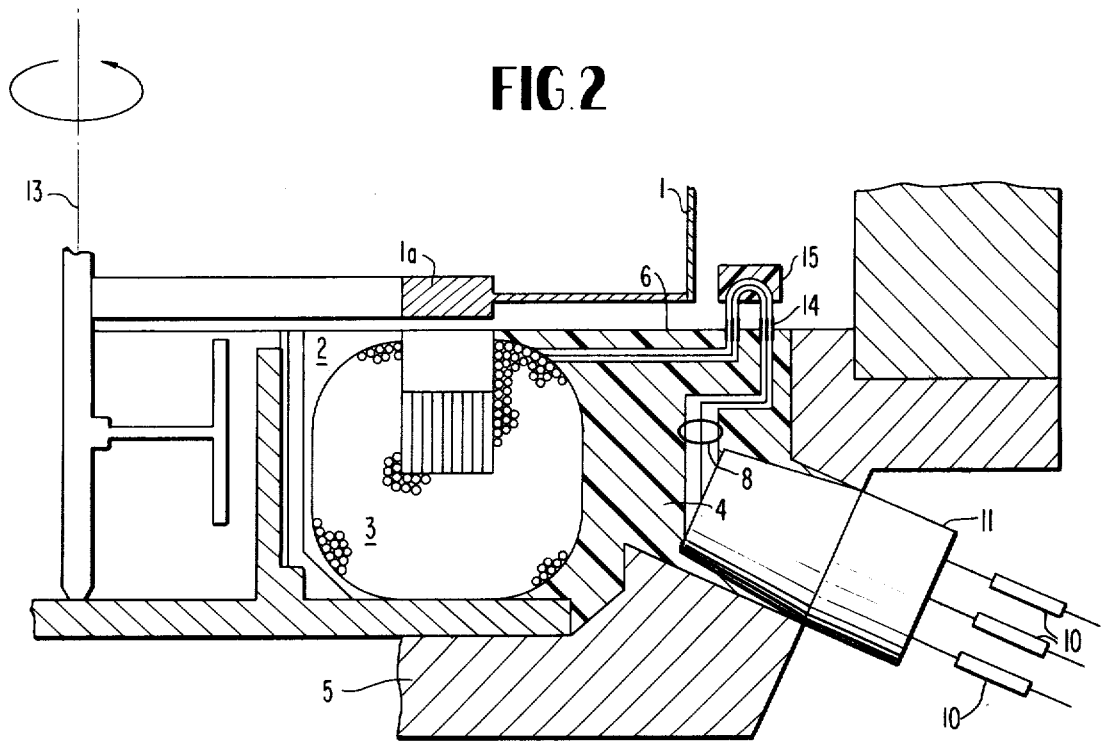

These and other objects, features and advantages of the present invention will become more apparent from the following description when taken in connection with the accompanying drawings which show, for purposes of illustration only, the embodiments in accordance with the present invention, and wherein FIG. 1 is a partial schematic cross-sectional view of a motor-driven rotating machine provided with an improved safety installation in accordance with the present invention, FIG. 2 is a partial schematic cross-sectional view of a motor-driven rotating machine provided with an improved safety installation in accordance with a second embodiment of the present invention.

Referring to the drawing figures, the reference numeral 1 designates a portion of a rotating machine part, which may be destroyed into fragments upon exceeding a predetermined rotational speed. The rotating machine part is rotated about an axix 13 by means of a driving motor, generally designated by the reference numeral 2, which includes a stator winding 3, surrounded by a winding sealing 4 of any conventional type in an external motor housing 5. The driving motor 2 causes rotation of the rotating machine part 1 by means of a disc 1a, such that the rotating machine part 1 is rotated about the axis 13.

The stator windings 3 are connected to a connector plug 11 by means of power supply wires 8. These power supply wires are formed in a loop 9 within a boss or lug member 7, which is connected to a surface 6 of a chamber in which the rotating machine part is rotated. The boss 7 is positioned approximately 6 to 8 mm laterally of the rotating machine part 1, so that it does not interfere with the rotation of the rotating machine part 1, however, will be struck by fragments of the machine part upon its destruction due to centrifugal forces.

The connector plug 11 provides a means for connecting the drive motor 2 to an external source of power. Fuses 10 are provided in this external line to interrupt the current upon short-circuiting of the drive motor.

In the embodiment shown in FIG. 2, a connecting plug 15 is held adjacent to the surface 6 of the rotating machine part chamber by means of connecting pins 14. These pins are of small dimensions, on the order of 1/32 inches, and provide a means for the electrical contact between the connector plug 11 and the driving motor 2. In this embodiment, fragments of the rotating machine part obtained from the rotational destruction of the rotating machine part will break or shear the connecting pins to interrupt the power supply to the driving motor.

While we have shown and described two embodiments in accordance with the present invention, it is understood that the same is not limited thereto but is susceptible of numerous changes and modifications as known to those skilled in the art, and We therefore do not wish to be limited to the details shown and described herein but intend to cover all such changes and modifications as are encompassed by the scope of the appended claims.

What we claim is:

1. In a device for automatically stopping a drive motor of a rotating member in the event of rotational destruction of the rotating member, said device being of the type having a pin-like boss means disposed adjacent to a rotating portion of said member in such a manner to be struck by fragments of said rotating member in the event of destruction thereof, wherein a portion of the power supply wires to the drive motor are disposed within said boss means, the improvement comprising said boss means being provided with a notch at the connection of said boss means to the device so that shearing of said boss means upon being struck by said fragments will be enhanced.

2. In a device for automatically stopping a drive motor of a rotating member in the event of rotational destruction of the rotating member, said device being of the type having a pin-like boss means disposed adjacent to a rotating portion of said member in such a manner to be struck by fragments of said rotating member in the event of destruction thereof, wherein a portion of the power supply wires to the drive motor are disposed within said boss means, the improvement comprising pin-like connecting means for connecting said boss means to the device, said pin-like connecting means being sufficiently thin such that said boss means will be sheared upon being struck by said fragments.

* * * * *